United States Patent [19]

McNiff

[11] Patent Number: 4,914,074

[45] Date of Patent: Apr. 3, 1990

[54] CATALYST COMPOSITION

[75] Inventor: Timothy K. McNiff, Weybridge, Surrey, England

[73] Assignee: The British Petroleum Company p.l.c., London, England

[21] Appl. No.: 267,206

[22] Filed: Nov. 3, 1988

[30] Foreign Application Priority Data

Nov. 18, 1987 [GB] United Kingdom ................ 8726974

[51] Int. Cl.$^4$ ........................ B01J 21/04; B01J 23/58; B01J 23/62; B01J 23/64
[52] U.S. Cl. ..................................... 502/226; 502/328
[58] Field of Search ........................ 502/226, 328, 334

[56] References Cited

U.S. PATENT DOCUMENTS

| 2,914,464 | 11/1959 | Burton et al. | 502/334 X |
|---|---|---|---|
| 3,772,183 | 11/1973 | Bertolacini et al. | 208/65 |
| 3,772,184 | 11/1973 | Bertolacini et al. | 208/65 |
| 3,857,780 | 12/1974 | Gustafson | 208/139 |
| 3,997,429 | 12/1976 | Rashkin | 208/139 |
| 4,025,561 | 4/1977 | Suggit et al. | 260/583 |
| 4,056,575 | 11/1977 | Gregory et al. | 260/673.5 |
| 4,078,743 | 3/1978 | Kogan et al. | 502/334 X |
| 4,220,558 | 9/1980 | Antos | 252/441 |
| 4,243,558 | 1/1981 | Antos | 252/466 |
| 4,460,457 | 7/1984 | Gibson et al. | 208/139 |
| 4,766,265 | 8/1988 | Desmond et al. | 585/415 |

FOREIGN PATENT DOCUMENTS

| 2130675 | 11/1972 | France . |
|---|---|---|
| 2163684 | 7/1973 | France . |
| 2358194 | 2/1978 | France . |
| 2594711 | 8/1987 | France . |

Primary Examiner—W. J. Shine
Attorney, Agent, or Firm—Larry W. Evans; Joseph G. Curatolo; Sue E. Phillips

[57] ABSTRACT

A novel catalyst composition which comprises alumina and platinum, is characterized in that the alumina carries internally and/or on its surface, gallium and a Group II metal. The catalyst composition is particularly useful in catalytic reforming of hydrocarbon feestocks.

8 Claims, No Drawings

CATALYST COMPOSITION

The present invention relates to a novel catalyst composition and to its use in hydrocarbon processing.

Catalytic reforming is a well known petroleum refining procedure. Essentially, a naptha feedstock is treated to improve the octane rating for use as a gasoline. A number of reactions occur in typical reforming. The naphthenic components are dehydroisomerized and dehydrogenated to aromatics. Paraffins are dehydrocyclized to naphthenes and aromatics; normal paraffins are isomerized to isoparaffins. The resulting product should be high in $C_5^+$ product (components having a boiling point of pentane or higher).

The use as catalysts in such processes of alumina loaded with metals such as platinum or rhenium is well known. Very many different catalysts have been proposed. For example, U.S. No. 4,220,558 discloses a catalyst which comprises platinum, rhenium and indium. UK 1408049 and UK 1414800 disclose catalysts containing platinum, rhenium and gallium. FR 2594711 1 discloses a catalyst containing platinum, an additional component chosen from tin, germanium, lead, gallium, indium and thallium, and a halogen, while FR 2358194 discloses catalysts containing platinum, one of gallium, indium or thallium, and an alkali metal. One problem which always occurs in such processes is that carbon is formed as a side reaction during the catalytic processing, and this carbon is deposited as coke on the surface of the catalyst. This causes various problems: in particular, it reduces long-term catalyst stability, and requires the use of increased pressures for the processing. Many attempts have been made to produce low-coking catalysts. It has however proved extremely difficult to produce a catalyst which combines high activity in the desired reaction with a low production of carbon. In general, those catalysts which do produce little carbon, tend to be of relatively low activity in the desired conversion.

The present invention provides a catalyst composition which comprises alumina and platinum; characterized in that the alumina carries internally and/or on its surface, gallium and a Group II metal.

In addition to platinum, the composition preferably also contains rhenium. The atomic ratio of platinum to rhenium is preferably in the range of from 5:1 to 1:5, preferably 2:1 to 1:2. Preferably the total amount of platinum, plus rhenium if present, is from 0.05 to 5.0, preferably 0.1 to 2.0, % by weight based on the total weight of the composition.

The amount of gallium present is preferably in the range of from 0.01 to 10, especially 0.01 to 1.0, preferably 0.02 to 0.5, % by weight based on the total weight of the composition.

The amount of Group II metal present is preferably in the range of from 0.1 to 10, especially 0.1 to 5.0, preferably 0.3 to 2.0, % by weight based on the total weight of the composition. Group II refers to Group II of the Mendeleev Periodic Table. The Group II metal is preferably a Group II A Metal, especially magnesium. A mixture of two or more Group II metals may be used if desired.

If desired, the catalyst composition according to the invention may contain one or more metals in addition to those specified above. Advantageously however it is substantially free from metals other than those metals specified above. In particular, the catalyst is preferably substantially free from indium.

The various metals present in the catalyst composition may be present in any suitable form. In a preferred embodiment, the gallium and Group II metal are incorporated internally within the alumina—i.e. they are present as dopants—while the platinum, and rhenium if present, are present as deposits on the surface of the alumina.

As is common in catalysts for reforming, the presence of chlorine in the composition leads to advantageous results. Suitably, the level of chlorine is in the range of 0.05 to 5.0, preferably 0.1 to 2.0, % by weight based on the total weight of the composition. Sulphur may also be present, for example in an amount of from 0.01 to 1, preferably 0.02 to 0.5, % by weight based on the total weight of the composition.

If desired, the catalyst composition may also contain one or more support materals in addition to the alumina. Clays and zeolites may for example be incorporated into the finished catalyst.

The invention also provides a process for the preparation of a catalyst composition according to the invention, which comprises mixing alumina with a solution or solutions containing platinum, gallium, and a Group II metal. Preferably, the mixing is carried out in such a way that the alumina is doped with gallium and a Group II metal, and subsequently treated with a solution containing platinum. Preferably, powdered alumina is mixed with a solution or solutions containing gallium and a Group II metal; the resulting mixture is processed to form a dough; the dough is extruded; and the extrudate is mixed with a solution containing platinum. Preferably, the solution containing platinum also contains rhenium.

The process may of course comprise any of the steps commonly used in catalyst processing. For example, calcination may be carried out under known conditions, preferably directly after the dough is extruded.

The invention further provides a process for increasing the octane number of a hydrocarbon feedstock, which comprises passing said feedstock over a catalyst composition according to the invention, at elevated temperature and pressure. The feedstock is suitably a naphtha, obtainable by distillation of crude oil or by catalytic cracking. Typical reaction temperatures are in the range of from 100° to 650° C., preferably 300° to 650° C., preferably 400° to 550° C. Typical pressures are up to 50 bar, preferably 5 to 35 bar.

The following Examples illustrate the invention.

EXAMPLE 1

2615 g of alumina powder were weighed out into the chamber of a 'WINKWORTH' (Trade Mark) Z-blade mixer (capacity 5 liters). A solution of 5% nitric acid containing 6.96 g gallium nitrate (anhydrous) and 191.8 g magnesium nitrate hexahydrate was added to the alumina and thoroughly mixed in. The acid was added continously with the constant mixing until the alumina could be extruded (1 liter acid, mix time=15 miniutes required). This was extruded using an extruder operated in the front end mode with a 2 mm plate. The resulting extrudate was dried and calcined in a forced airflow using the following temperature program: 50° C. to 150° C. at 100° C./hr, held at 150° C. for 2 hours; 150° C. to 350° C. at 100° C./hr, held at 350° C. for 2 hours; 350° C. to 650° C. at 100° C./hr; and held at 625° C. for 4 hours prior to cooling. The extrudate was then broken up to give pieces about 5 mm in length.

The extrudate was impregnated by mixing with an acidic aqueous solution containing chloroplatinic acid ($H_2PtCl_6$), and ammonium perrhennate ($NH_4ReO_4$). The amounts per 100 g of extrudate were $H_2PtCl_6$:1 g, $NH_4ReO_4$:0.36 g. The solution and extrudate were contained in a 5 liter glass flask which was rotated while heat was applied.

In this way the water was slowly removed over a period of 16-20 hours. The extrudate was then calcined in a forced airflow using the following temperature program: 50° C. to 150° C. at 100° C./hr, held at 150° C. for 2 hours; 150° C. to 280° C. at 100° C./hr, held at 280° C. for 2 hours; 280° C. to 350° C. at 100° C./hr, held at 350° C. for 2 hours; 350° C. to 420° C. at 100° C./hr, held at 420° C. for 2 hours, and 420° C. to 565° C. at 100° C./hr, held at 565° C. for 4 hours.

Analysis by x-ray fluorescence spectroscopy on this catalyst showed Pt: 0.27% wt; Re: 0.23% wt; Cl: 0.5% wt; Ga: 0.07% wt; and Mg: 0.8% wt.

The catalyst was tested in a quartz tubular reactor vertically mounted in a furnace. The catalyst charge was 10 mls. This was treated with hydrogen flowing at 90 ml/min for 2 hours at 520° C. The temperature was then dropped to 480° C. and the feed (commercial naptha) was passed over the catalyst at 12 ml/hr. The hydrogen flow was adjusted so as to give a $H_2$/hydrocarbon feed ratio of approximately 2.0. This was continued for four hours over which time the product was collected to give a bulk sample. This was weighed and analysed using gas chromatography. The catalyst was allowed to cool under nitrogen. The level of carbon deposited as coke on the catalyst was determined using a combustion method.

The results are given in Table 1.

Comparative Example 1 (a)

In this example the catalyst was prepared in exactly the same way as described in example 1, except that gallium nitrate and magnesium nitrate were not present in the 5% nitric acid used in the dough preparation prior to extrusion.

Analysis by x-ray fluorescence spectroscopy on this catalyst showed Pt: 0.29% wt; Re: 0.24% wt; and Cl: 0.48% wt.

The catalyst was tested as in example 1. The results are given in Table 1. It can be seen from the results shown in Table 1 that the novel catalyst composition according to the invention is much less prone to coking than the prior art catalyst, while maintaining a high level of useful catalytic activity.

EXAMPLE 2

In this example the catalyst as prepared as in Example 1. It was then loaded into a quartz reactor and heated to 520° C. in a tubular furnace. Hydrogen was passed over the catalyst at 140 ml/min for 2 hours. The temperature was reduced to 250° C. and the hydrogen flow to 80 ml/min. A mixture of naptha spiked with approx 0.015 g of dimethyl disulphide was passed over the catalyst at 12 mls/hr for 2 hours. The catalyst was then cooled under nitrogen.

The catalyst was tested in a stainless steel tubular reactor vertically mounted within a phosphor bronze block which was located in a furnace. The catalyst charge was 16 mls. The catalyst was first treated with hydrogen flowing at 400 ml/min while the temperature was raised from ambient to 510° C. at 2.5° C. per minute. The reactor pressure was 12 bar gauge. The catalyst was maintained at 510° C. for 2 hours. The temperature was then reduced to 350° C. under nitrogen.

The feed (commerical naptha) was then passed over the catalyst at 41 mls/hr for 2 hours after which the temperature was raised at 1.7° C./minute to 518° C. The catalyst was maintained under these conditions for approximately 172 hours. Product samples were collected over 24 hour periods for analysis.

The results are shown in Table 1.

EXAMPLE 3

The procedure of Example 1 as repeated with the following variations: the initial calcination temperature was 648° C. instead of 625° C.; the second calcination was carried out as follows: the sample was placed directly in a furnace at 180° C. and left at this temperature for 1.25 hours, removed and placed in a second furnace at 350° C., left at this temperature for 1.25 hours, removed and placed in a furnace at 565° C., left at this temperature for 2 hours; analysis after this second calcination showed Pt: 0.26% wt, Re: 0.22% wt, Cl: 0.99% wt, Ga: 0.06% wt, Mg: 0.89% wt; and the catalyst testing was carried out over 2.5 hours instead of 4 hours. The results are given in Table 1.

Comparative Examples 3(a)-3(c)

Comparative examples were carried out as in Exmple 3 with the following exceptions.

3(a)—no gallium nitrate or magnesium nitrate hexahydrate was added.

3(b)—no gallium nitrate was added.

3(c)—no magnesium nitrate hexahydrate was added. The results are given in Table 1. It can be seen that in all cases the comparative catalysts have increased coking over the catalyst according to the invention, coupled with both lower yield and lower selectivity to aromatics.

EXAMPLE 4

The process of Example 3 was repeated except that no ammonium perrhennate was added. The results are given in Table 1.

Comparative Example 4(a)

The process of Example 4 was repeated except that the magnesium nitrate hexahydrate was replaced by lithium carbonate. The results are given in Table 1, and show that the aromatics productivity of the comparative catalyst is less than 60% of that of the catalyst of the invention.

TABLE 1

| Example | *Carbon on Feed wt % | Liquid Yield % wt/wt | **Aromatics Productivity (wt) hr$^{-1}$ |
|---|---|---|---|
| 1 | 0.21 | 84.2 | 0.588 |
| Comparative 1 | 0.54 | 79.0 | 0.466 |
| 2 | 0.0067 | 82.77 | 1.860 |
| 3 | 0.31 | 81.60 | 0.826 |
| Comparative 3(a) | 0.45 | 74.20 | 0.660 |
| Comparative 3(b) | 0.35 | 77.97 | 0.800 |
| Comparative 3(c) | 0.58 | 79.54 | 0.710 |
| 4 | 0.78 | 85.40 | 0.827 |

TABLE 1-continued

| Example | *Carbon on Feed wt % | Liquid Yield % wt/wt | **Aromatics Productivity (wt) hr$^{-1}$ |
|---|---|---|---|
| Comparative 4(a) | 0.30 | 88.50 | 0.470 |

*Carbon on Feed = (wt of carbon on catalyst/wt of feed) × 100
**Aromatics productivity (wt) = [(wt % aromatics in product) × (wt % yield of liquids) × (wt of feed)]/[wt of catalyst) × (hours onstream) × 10$^4$]

I claim:

1. A catalyst composition which comprises alumina and platinum; characterized in that the alumina carried internally and/or on its surface, gallium and a Group II A metal.

2. A catalyst composition as claimed in claim 1, in which the Group II A metal is magnesium.

3. A catalyst composition as claimed in claim 1, which also contains rhenium.

4. A catalyst composition as claim in claim 3, which is substantially free from metals other than platinum, rhenium, gallium and a Group II A metal.

5. A catalyst composition as claimed in claim 1, which also comprises chlorine.

6. A catalyst composition as claimed in claim 1, in which the gallium and Group II A metal are incorporated internally within the alumina, while the platinum, and rhenium if present, are present as deposits on the surface of the alumina.

7. A process for the preparation of a catalyst composition as claimed in claim 1, which comprises mixing alumina with a solution or solutions containing platinum, gallium, and a Group II A metal.

8. A process as claimed in claim 7, carried out in such a way that the alumina is doped with gallium and a Group II A metal, and subsequently treated with a solution containing platinum.

* * * * *